US012750325B2

(12) United States Patent
Oltchik et al.

(10) Patent No.: US 12,750,325 B2
(45) Date of Patent: Sep. 29, 2026

(54) ROUTING IN A COMPUTER NETWORK USING IN-NETWORK COMPUTING

(71) Applicant: Mellanox Technologies, Ltd., Yokneam (IL)

(72) Inventors: Yishai Oltchik, Givatayim (IL); Michael Gandelman Milgrom, Aventura, FL (US); Omer Shabtai, Tel Aviv (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 18/214,893

(22) Filed: Jun. 27, 2023

(65) Prior Publication Data

US 2025/0007856 A1 Jan. 2, 2025

(51) Int. Cl.

*H04L 47/726* (2022.01)
*H04L 47/70* (2022.01)
*H04L 47/80* (2022.01)

(52) U.S. Cl.

CPC .......... *H04L 47/726* (2013.01); *H04L 47/805* (2013.01); *H04L 47/821* (2013.01)

(58) Field of Classification Search

CPC ....... H04L 41/145; H04L 41/16; H04L 43/50; H04L 41/142; H04L 41/147; H04L 47/805; H04L 45/302; H04L 47/70; H04L 12/465; H04L 41/0823; H04L 45/02; H04L 45/125; H04L 45/44; H04L 47/15; H04L 47/724; H04L 47/762; H04L 49/354; H04L 49/70; H04L 63/1416; H04L 63/1425; H04L 63/1491; H04L 41/0896; H04L 45/04; H04L 45/16; H04L 45/50; H04L 47/806; H04L 47/822; H04L 49/109; H04L 67/10; H04L 67/12; H04L 12/18; H04L 41/0806; H04L 41/0816; H04L 41/0895; H04L 41/40; H04L 67/63; H04L 41/12; H04L 45/24; H04L 47/125; H04L 45/42; H04L 45/28; H04L 45/38; H04L 47/10; H04L 47/20; H04L 67/51; H04L 67/568; H04L 43/08; H04L 47/12; H04L 47/32; H04L 45/123; H04L 45/22; H04L 47/11; H04L 45/64; H04L 47/34; H04L 67/1001;

(Continued)

(56) References Cited

U.S. PATENT DOCUMENTS

| | | | | |
|---|---|---|---|---|
| 8,732,298 | B2 * | 5/2014 | Shi | H04L 45/00 709/224 |
| 9,407,561 | B2 * | 8/2016 | McCormick | H04L 47/2441 |

(Continued)

OTHER PUBLICATIONS

Qingming Ma and P. Steenkiste, "On path selection for traffic with bandwidth guarantees," Proceedings 1997 International Conference on Network Protocols, Atlanta, GA, USA, 1997, pp. 191-202, doi: 10.1109/ICNP.1997.643714. (Year: 1997).*

(Continued)

*Primary Examiner* — Djenane M Bayard
(74) *Attorney, Agent, or Firm* — PEARL COHEN LLP

(57) ABSTRACT

A system and method for performing routing in a computer network implementing in-network computing, including: obtaining information regarding compute resources allocated to an in-network compute operation; and allocating a path and bandwidth for ordinary network traffic based on the allocated compute resources.

20 Claims, 3 Drawing Sheets

(58) Field of Classification Search
CPC ............... H04L 67/1008; H04L 67/101; H04L 43/0876; H04L 45/566; H04L 45/74; H04L 47/2408; H04L 49/90; H04L 49/9057; H04L 67/148; H04L 67/02; H04L 69/329; H04L 51/04; H04L 51/066; H04L 65/1101; H04L 65/752; H04L 65/613; H04L 43/0882; H04L 43/0894; H04L 41/0893; H04L 1/0003; H04L 43/16; H04L 45/00; H04L 45/70; H04L 67/104; H04L 67/34; H04L 1/0026; H04L 1/0028; H04L 1/0675; H04L 12/1827; H04L 12/185; H04L 12/40039; H04L 12/40136; H04L 12/413; H04L 27/2647; H04L 41/08; H04L 41/0803; H04L 41/083; H04L 41/0869; H04L 63/0272; H04L 63/20; H04L 61/2514; H04L 61/2517; H04L 61/2564; H04L 63/0428; H04L 65/1043; H04L 65/1069; H04L 65/65; H04L 61/5007; H04L 61/5014; H04L 12/66; H04L 61/5038; H04L 41/0836; H04L 41/0894; H04L 41/5054; H04L 63/062; H04L 63/065; H04L 63/0876; H04L 63/104; H04L 47/30; G06F 13/4022; G06F 1/266; G06F 1/26; G06F 7/76; G06F 13/4027; G06F 9/505; G06F 9/5027; G06F 9/5072; G06F 2209/509; G06F 2213/0026; G06F 13/4221; G06F 13/4269; G06F 13/4282; G06F 11/2005; G06F 12/1063; G06F 13/12; G06F 13/128; G06F 13/42; G06F 3/0601; G06F 3/0635; G06F 3/0662; G06F 3/0664; G06F 3/067; G06F 9/45558; G06F 1/1632; G06F 11/3495; G06F 15/7832; G06F 21/57; G06F 9/5022; G06F 1/00
See application file for complete search history.

(56) References Cited

U.S. PATENT DOCUMENTS

| | | | | | |
|---|---|---|---|---|---|
| 11,037,075 | B2 * | 6/2021 | Li | G06Q 50/40 | |
| 2004/0246905 | A1 * | 12/2004 | Dunagan | H04L 45/24 | 370/252 |
| 2011/0019560 | A1 * | 1/2011 | Karaoguz | H04L 45/125 | 370/252 |
| 2014/0006822 | A1 * | 1/2014 | Diab | H04L 41/0816 | 713/320 |
| 2023/0412488 | A1 * | 12/2023 | Kumar Mishra | G06N 3/044 | |

OTHER PUBLICATIONS

Landmann, R, article: Red Hat; Red Hat Enterprise Linux 4, Introduction To System Administration; For Red Hat Enterprise Linux 4, Edition 2; Copyright © 2008 Red Hat, Inc, last updated Mar. 17, 2020.

* cited by examiner

ROUTING IN A COMPUTER NETWORK USING IN-NETWORK COMPUTING

FIELD

The present invention relates generally to routing in a computer communication network that implements in-network computing.

BACKGROUND

State of the art network switches and smart network interface cards (NICs) may include computing resources such as processors, memory and/or programmable hardware that are generally intended to be used for switching operations (or for other suitable purposes). In-network computing may refer to using those computing resources for executing standard applications that would otherwise be executed by the host processor, and in-network traffic may refer to data related to the in-network computing that is streamed in the network. Thus, in-network computing may offload the host processor, and spare cycles of the host processor for other tasks. In addition, in-network computing may reduce network traffic and free up network resources since data is terminated before it gets to the host and therefore travels a shorter route. In-network computing has been applied to date to a range of applications, including, but not limited to machine learning, in-network caches, consensus protocols and network services.

SUMMARY

According to embodiments of the invention, a computer-based system and method for performing routing in a computer network implementing in-network computing, may include: obtaining information regarding compute resources allocated to an in-network compute operation; and allocating a path and bandwidth for ordinary network traffic based on the allocated compute resources.

Embodiments of the invention may include allocating paths for in-network traffic associated with the in-network compute operation, where allocating the path and bandwidth for the ordinary network traffic may be performed by reducing the priority of paths that are allocated for the in-network traffic.

Embodiments of the invention may include estimating a required bandwidth for the in-network traffic in the paths allocated for the in-network traffic based on the required compute resources, where allocating bandwidth for the ordinary network traffic in the paths allocated for the in-network traffic may be performed based on the required bandwidth.

According to embodiments of the invention, the bandwidth for the ordinary network traffic may be allocated so that the ordinary network traffic in a path serving the in-network traffic is inversely related to the required compute resources.

According to embodiments of the invention, the path for the ordinary network traffic may be allocated so that the ordinary network traffic in a path serving the in-network traffic is eliminated.

Embodiments of the invention may include obtaining metadata of the in-network compute operation; and estimating a required bandwidth for in-network traffic based on the required compute resources and the metadata, where allocating the path for the ordinary network traffic may be performed based on the bandwidth required for the in-network traffic.

According to embodiments of the invention, the metadata may include at least one element form: data type of the in-network compute operation, type and capacity of network components that form a path allocated for in-network traffic, what operation is performed by the in-network compute operation, quality of service (QOS) of the in-network compute operation and prioritization of the in-network compute operation.

Embodiments of the invention may include allocating paths and bandwidth for the in-network traffic based on the required compute resources.

According to embodiments of the invention, the path and bandwidth for the ordinary network traffic may be allocated using flow adaptive routing, where paths and bandwidth for in-network traffic may be allocated statically.

According to embodiments of the invention, a computer-based system and method for performing routing in a computer network, may include: obtaining required compute resources associated with an in-network operation; allocating paths in the computer network for traffic that is related to the in-network operation according to the required compute resources; and reducing traffic that is not related to the in-network operation in the allocated paths.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. Embodiments of the invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
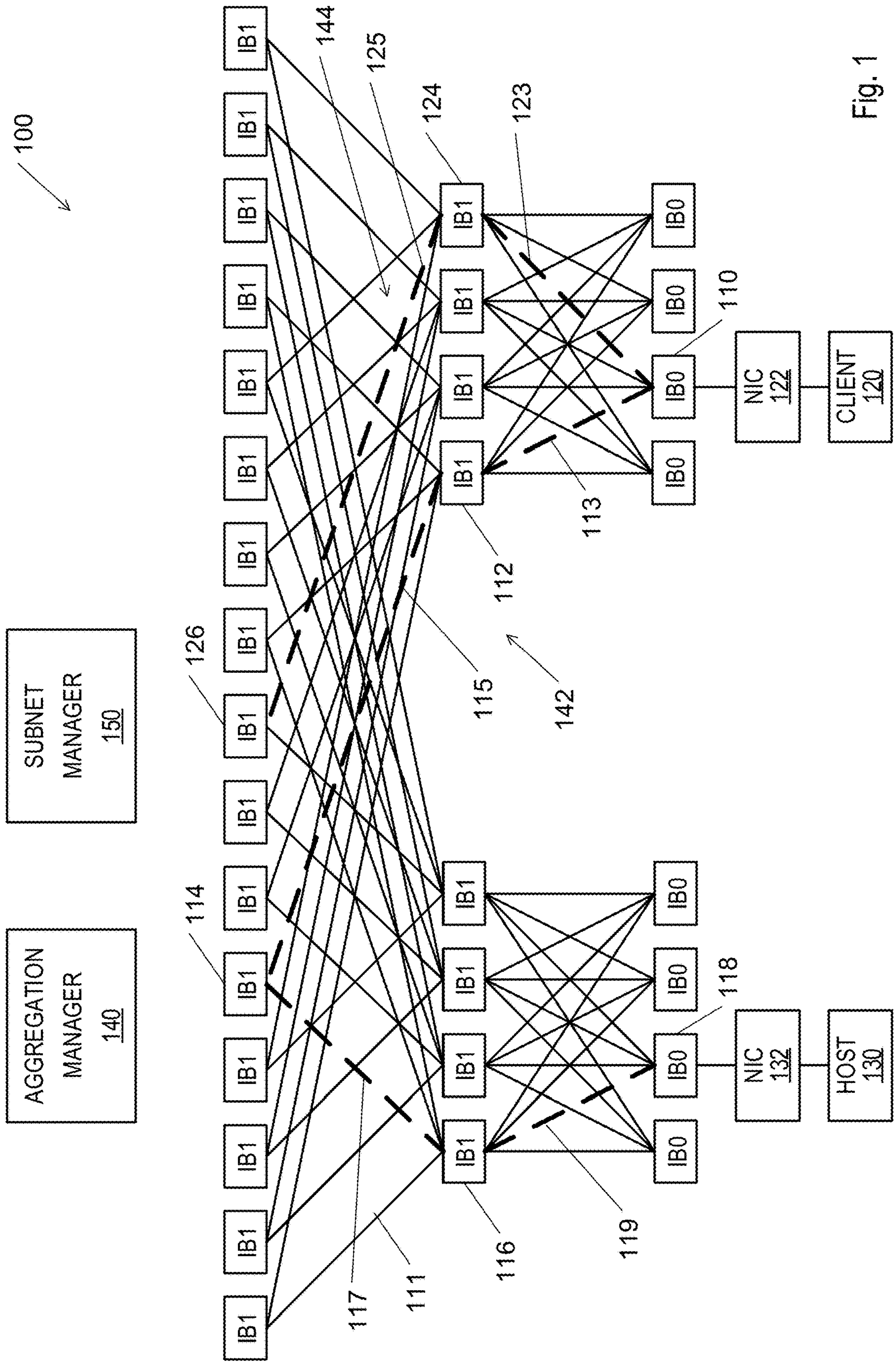
FIG. 1 depicts a high-level schematic diagram of a computer network that implements in-network computing, according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of embodiments of the invention. However, it will be understood by those skilled in the art that the present invention can be practiced without these specific details. In other instances, well-known methods, procedures, and components, modules, units and/or circuits have not been described in detail so as not to obscure embodiments of the invention.

Embodiments of the invention may predict the pattern and intensity (e.g., bandwidth) of in-network traffic based on allocation metadata and may consider the allocations of in-network compute resources and the predicted traffic pattern and intensity in the routing process of ordinary network traffic. The proposed mechanism may compensate for the topological bias introduced by the compute resource allocation and the traffic demand on specific switch ports of in-network computations, by adjusting path selection and bandwidth allocation for the ordinary network traffic based on the allocated network resources and the predicted in-network traffic. Adjusting path selection and bandwidth allocation for the ordinary network traffic may improve the overall network performance and avoid congestion in network paths. Thus, embodiments of the invention may improve the technology of network routing, specifically with relation to in-network compute operations.

In many applications, paths for the in-network traffic are selected and allocated, e.g., by a central management unit, per an in-network compute task. Typically, those paths remain allocated to the in-network traffic of that specific task as long as the task is active and may be released once the in-network compute task has ended. In typical use cases, the expected life cycle of an in-network compute task, and therefore, of the in-network paths allocated for that in-network compute traffic, may reach minutes, or even hours or days. Adaptive routing mechanisms that are used to allocated paths for the ordinary network traffic, however, typically refer to timeframes in the order of milliseconds. In some applications, when in-network paths are allocated, they are not utilized all the time. Thus, the predicted bandwidth of the in-network traffic in the allocated in-network paths may change over time during the life cycle of the in-network task. Even in this case, however, the changes in the bandwidth expected in the in-network paths are at least an order of magnitude slower than that timeframes of ordinary network traffic path allocations. According to embodiments of the invention, due to this huge difference in timeframes, the paths for the in-network compute traffic may be treated by the adaptive routing mechanisms as permanent for the time frame for which the paths for the ordinary network traffic are allocated.

Reference is made to FIG. 1, which is a high-level schematic diagram of a computer network that implements in-network computing, according to embodiment of the invention. It should be readily understood that the components and functions shown in Fig. I are intended to be illustrative only and embodiments of the invention are not limited thereto.

Network 100 may include any type of computer network or combination of networks available for supporting communication among computing devices, referred to as nodes, such as client 120 and host 130 via one or more switches IB0 and IB1, and implements in-network computing. In some embodiments switches IB0 and IB1 may form a hierarchy, in which switches IB0 may form the lowest level in the hierarchy and may be connected to a node (e.g., client 120 and host 130 or other types of nodes), while switches IB1 may form higher levels in the hierarchy and may be connected to other switches and/or routers (some or all of switches IB1s may also be routers). Some or all of switches IB0 and IB1 may be or may include a computing device such as computing device 700 depicted in FIG. 3, and thus may include computing resources such as processors, memory and/or programmable hardware that may be generally intended to be used for switching operations (or for other suitable purposes, or specifically for in-network compute operations). In some use cases, network 100 may utilize those computing resources for executing standard applications that would otherwise be executed by the processor of host 130. Switches IB0 and IB1 may be interconnected to each other by links or edges 111, 113, 115, 117, 119, 123 and 125 (the terms links and edges may be used herein interchangeably to refer to connections between two adjacent network components) in any suitable topology. As known, each of links or edges 111, 113, 115, 117, 119, 123 and 125 may have two ports associated with it, a port used for traffic to physically enter the link (and exit a switch), and a port to physically exit the link (and enter a switch).

Network 100 may be implemented, for example, in data centres, high-performance compute clusters and embedded applications that may scale from two nodes up to clusters utilizing thousands of nodes or more. Thus, it is noted that while only one client 120 and one host 130 are shown in FIG. 1, this is not limiting and network 100 may be used for interconnecting a plurality of clients 120 to a plurality of hosts 130, and other computing recourses such as storage, embedded systems, etc. Client 120 may be connected to switch 110 via a network interface controller (NIC) 122, also referred as a host channel adapter and host 130 may be connected to switch 118 via a NIC 132. Links 111 may include for example, a wired, fiber optic, or any other type of connection. Each of client 120, NIC 132, host 130 and NIC 132 may include computing device a such as computing device 700 depicted in FIG. 3.

According to some embodiments, network 100 may operate in accordance with InfiniBand (IB) specifications. Relevant features of the IB architecture are described in the InfiniBand™ Architecture Specification Volume 1Release 1.6, published Jul. 15, 2022, or other releases, distributed by the InfiniBand Trade Association. Alternatively, network 100 may operate in accordance with other computer communication standards such as Ethernet networks, e.g., as defined by the IEEE 802.1ah standard, and other communication schemes.

Network 100 may stream data (typically organized into data packets) also referred to herein as traffic), among components of network 100 such as client 120, host 130, NICs 122 and 132, switches IB0 and IB1 via links 111, 113, 115, 117, 119, 123 and 125. Network 100 may implement in-network computing. Accordingly, some of the traffic streamed in network 100 may be related to, e.g., intended for, in-network compute operations or tasks. Traffic related to or indented for in-network computing may be referred to herein as in-network traffic. Other traffic, e.g., regular traffic (e.g., not the in-network compute packets) streamed in network 100 may be referred to herein as traffic that is not related to in-network computing or singly as ordinary network traffic.

As used herein the terms route or path may refer to a full sequence of hops from one endpoint to another in network 100. For example, client 120 (e.g., a first endpoint) may communicate with host 130 (a second endpoint) over network 100 via a route or a path including NIC 122, switch 110, link 113, switch 112, link 115, switch 114, link 117, switch 116, link 119, switch 118, and NIC 132. Additionally or alternatively, some of the computing requests of client 120 may be performed by components of network 110, such as switch 114. In this case, the in-network traffic may be steamed between client 120 (e.g., the first endpoint) and switch 114 (the second endpoint) via a path or route including NIC 122, switch 110 link 113, switch 112 and link 115 only.

The term bandwidth may refer to an amount of data that may be streamed or transferred through a path or a link, and may be provided in absolute terms (e.g., bits per second, BPS), or in relative terms, e.g., as a percent of a total capacity of the link or path. Assigning or allocating a path or a route for a stream of data (network traffic) may include assigning or controlling switches (selected from IB0 and IB1) that will form the path or route, and for each of the selected switches, selecting an ingress port that will lead to the assigned link that is connected to the next switch in the path or route. Assigning an ingress port for a particular data stream may include changing values in a switch forwarding table. Other mechanisms may be used.

Network 100 may include management applications such as aggregation manager (AM) 140 and subnet manager (SM) 150. While drawn and described as two different applications, the functionality AM 140 and SM 150 may be combined into a single application. Each of AM 140 and SM 150 may include a combined hardware and software element, such as computing device 700 depicted in FIG. 3, including an embedded or stand-alone processor or central processing unit (CPU), with a memory and suitable interfaces. Each of AM 140 and SM 150 may be implemented on dedicated hardware, or integrated with one of the nodes in network 100, such as a host computer 130 or switches IB0 and IB1, and possibly shared with other computing and communication functions. AM 140 and SM 150 may be implemented as two software applications or processing modules on a shared computing unit or on separate computing units, as long as there is communication between AM 140 and SM 150. The software components of AM 140 and SM 150 may be downloaded to the computing device in electronic form, for example over network 100 or via a separate control network (not shown). Alternatively or additionally, these software components may be stored on tangible, non-transitory computer-readable media, such as in optical, magnetic, or electronic memory.

According to some embodiments, AM 140 may manage in-network compute operations or tasks within network 100. AM 140 may allocate or designate the in-network compute resources that are required for performing the in-network computing operations. The in-network compute resources may include, for example, processing power or processing units of any of NICs 122 and 132 and switches IB0 and IB1, and the in-network computing operations may include the computations required by client 120 that are designated to be performed by components of network 100. Other compute operations may be performed by network 100. AM 140 may know the topology of network 100, e.g., the arrangement and capabilities of switches IB0 and IB1 and edges 111. Knowing both the required compute resources and the network topology, AM 140 may allocate routes or paths and bandwidth for the in-network traffic that is required for performing the in-network task, based on the required compute resources. Routes or paths for the in-network traffic may be allocated, for example, by selecting static paths for the in-network traffic. As used herein, a static path may refer to a single path that is assigned for a stream of traffic and is the only path that is used for that particular stream of traffic, as opposed to allocation of a plurality of paths for a particular stream of traffic, where the stream of traffic may be dynamically directed to one of those paths or to another. AM 140 may receive requests for resource allocation for in-network computing (e.g., from client 120, from a user through client 120, or from a job scheduler application that receives requests from the user or client 120), which may be augmented with additional information (e.g., "hints") about specific requirements, and may allocate paths and resources accordingly. The additional information or "hints" may be provided by the user that initiates the in-network task, and may include for example, an estimation of the amount, rate or bandwidth of the in-network traffic that may be required for performing the in-network task. In some embodiments, every allocation of a network resource, e.g., one of switches IB0 and IB1, for an in-network computing task may be associated with one path only, e.g., a static path, that may be used for streaming the in-network traffic associated with that in-network computing resource.

In the example in which computing resource such as switch 114 is allocated to perform in-network compute operations for client 120, AM 140 may allocate a route or a path 142 between client 120 (via NIC 122) and switch 114 that may include, for example, link 113, switch 112 and link 115. AM 140 may also determine and allocate the bandwidth for the in-network traffic within the allocated path 142. In case that switch 126 is also allocated for performing in-network compute operations for client 120, AM 140 may further allocate a second route or path 144 between client 120 and switch 126 that may include, for example, link 123, switch 124 and link 125, and may determine the required bandwidth in the allocated route 144. It is noted that the examples provided above are not limiting, and in-network resources may be allocated for other clients, and use other network components, routes and paths.

According to embodiments of the invention, AM 140 may predict, estimate or calculate the pattern and intensity of the in-network traffic, e.g., the bandwidth required for the in-network traffic in the allocated paths 142 and 144 including the expected changes in the required bandwidth over time. The prediction may be performed, for example, based on the allocated resources as well as the allocation metadata, e.g., features or characteristics of the in-network compute operations, features or characteristics of the allocated in-network compute resources and features or characteristics of network 100 and the allocated in-network compute links.

For example, some traffic demands of in-network compute operations may be more specialized than that of ordinary network traffic. By considering this specialization, it may be possible to apply more specific optimizations to network 100. In particular, the type of the in-network operation and data type required for the in-network operation, both known to AM 140, may provide information about the pattern of the in-network traffic. For example, operations on IEEE double-precision data types may be indicative of a high performance computing (HPC) application that is typically characterized in bursts of in-network traffic that correspond to phases of the HPC application, whereas operations on truncated floating-point values such as Bfloat16 may be suggestive of a consistent stream of in-network traffic belonging to deep learning applications.

Thus, AM 140 may obtain metadata of the in-network compute operation, and may estimate the required bandwidth and the expected changes in the required bandwidth over time (e.g., the bandwidth pattern) for the in-network traffic based on the required compute resources and the metadata. For example, the metadata may include one or more of:

- The quantity of in-network compute resources allocated to the in-network compute task by AM 140, which may correlate with the size of the in-network compute task.
- The data type of the in-network compute operation (e.g., IEEE double-precision, truncated floating-point, etc.),
- The type and capacity (e.g., maximal bandwidth) of the network components (e.g., switches IB0 and IB1) that form the path allocated for the in-network traffic of the in-network operation. For example, the lowest maximal bandwidth of the network components that form the path allocated for the in-network traffic may set the maximal bandwidth for the entire path.
- What operation is performed by the in-network compute operation. Similarly to the data type, some operations typically require burst of data while other operations require relatively constant flow of data.
- Quality of service (QOS) of the in-network compute operation and prioritization of the in-network compute operation. The higher is the QoS, the more strict the bandwidth requirements on the allocated links may be.

Bandwidth requirements may be estimated by AM 140 based on the above listed metadata, as well as other factors. For example, AM 140 may independently decide to restrict the amount of in-network compute traffic over some of the links 111, 113, 115, 117, 119, 123 and 125 due to considerations of the network topology, e.g., the network layout, cable lengths, cable capacity, etc., that may influence or limit the maximal possible bandwidth of one or more links along a path.

AM 140 may allocate paths and bandwidth for in-network traffic based on the estimated bandwidth requirements. The allocated bandwidth may be persistent (e.g., constant over a certain time period), or flexible, and may define a percent of the possible bandwidth of a path or a link that will be allocated or guarantied to the for in-network traffic. For example, AM 140 may force some resources to provide 50% bandwidth in a certain link to in-network traffic. Additionally or alternatively, client 120 (e.g., a user application executed by client 120) may indicate or instruct AM 140 to allocate a certain bandwidth for the in-network operation or task required by client 120. The allocated paths and bandwidth in each link may be transmitted or provided to the relevant switches IB0 and IB1. The bandwidth requirements and allocations may change over time, and the changes may be transmitted or provided to the relevant switches IB0 and IB1 as well.

SM 150 may run management software that may perform management functions of network 100, e.g., as defined by the relevant communication standard of network 100. SM 150 may allocate paths 111 to ordinary network traffic and apply load balancing between the available paths in a way that may optimize or improve the utilization of network 100.

According to embodiments of the invention, a component in network 100, e.g., SM 150, may obtain, e.g., from AM 140, information regarding one or more compute resources allocated to an in-network compute operation, e.g., one or more of NICs 122 and 132 and switches IBO and IBI, and allocate paths and bandwidth for traffic that is not related to the in-network compute operation (e.g., the ordinary network traffic) based on the associated compute resources.

For example, the information regarding one or more compute resources allocated to an in-network compute operation provided to SM 150 from AM 140 may include paths 142 and 144 allocated for the in-network traffic and bandwidth estimated and allocated in those paths to the in-network traffic. SM 150 may allocate paths and bandwidth for traffic that is not related to the in-network compute operation (e.g., the ordinary network traffic) based on this information. For example, SM 150 may apply allocation schemes for allocating paths and bandwidth for ordinary network traffic, and may adjust those allocation schemes by reducing the priority of paths 142 and 144 that are allocated for the in-network traffic. Thus, paths 142 and 144 that are allocated for the in-network traffic may have reduced priority for ordinary network data. In some embodiments, SM 150 may allocate paths and bandwidth for the ordinary network traffic by avoiding completely paths 142 and 144 that are allocated for the in-network traffic. In some embodiments, SM 150 may only reduce ordinary network traffic in paths 142 and 144 allocated to the in-network traffic. For example, it may be assumed that the amount of the required computing resources that are required for performing an in-network task is related to or indicative of the amount of in-network traffic required for performing the in-network task. Thus, the paths for the ordinary network traffic may be allocated so that the ordinary network traffic in paths 142 and 144 serving in-network traffic is inversely related to the required compute resources. In some embodiments, paths and bandwidth for ordinary network traffic are allocated so that the ordinary network traffic in paths 142 and 144 serving in-network traffic may be inversely proportional to the required compute resources.

As noted, in some embodiments, AM 140 may estimate the required bandwidth for the in-network traffic, including expected changes in the required bandwidth over time, based on the required compute resources and metadata such as the in-network data type or the type of in-network operations, as well as other factors as disclosed herein, and may provide the bandwidth to SM 150 as well. Thus, SM 150 may allocate paths for the ordinary network traffic based on the bandwidth required for the in-network traffic in the in-network paths 142 and 144. According to some embodiments, SM 150 may allocate paths and bandwidth for ordinary network traffic by affecting the flow adaptive routing operation in switches IB0 and IB1. When using flow adaptive routing, switches IB0 and IB1 may select links 111 for each flow or stream of ordinary network data on-the-run, based on the current state of congestion in the network as well as other parameters. SM 150 may limit the choice of links 111 for the flow adaptive routing in switches IB0 and IB1 if SM 150 knows that some of the links 111 are expected to have a surge of demand from the in-network compute traffic. By limiting the choice of links 111, SM 150 may steer the ordinary network traffic away from the in-network compute paths 142 and 144. Limiting the choice of links 111 may include removing a link altogether (e.g., not enabling the flow adaptive routing mechanism to select this link), or reducing the probability of some links to be selected and by this statistically reducing the overall amount of ordinary network sent to those links.

According to some embodiments, SM 150 (and/or switches IB0 IB1) may obtain the in-network paths 142 and 144, the required bandwidth and bandwidth pattern (e.g., changes over time) of the in-network traffic in the in-network paths 142 and 144 from AM 140, and may adjust the bandwidth for the ordinary network traffic in the in-network paths 142 and 144 based on the information provided by AM 140. For example, if AM 140 expects bursts of in-network traffic (e.g., in case of certain data types or in-network operations), then SM 150 may either be less restrictive towards the ordinary network traffic since the links reserved for the in-network traffic may be idle for long time periods, or SM 150 may try to be more opportunistic and/or reactive with adaptive routing for the ordinary network traffic in order to take advantage of time-windows during which the links allocated for the in-network traffic are idle, e.g., by reducing the probability of those links being selected to some extent. In another example, if AM 140 expects a distributed machine learning application, for example since the metadata of the in-compute operation indicates using Bfloat16 data type, then it may be assumed that the links allocated for the in-network traffic may be kept constantly busy for the vast majority of the time, and SM 150 may be more aggressive in having the ordinary network traffic avoid those links, e.g., by reducing the probability of those links being selected by a larger extent or by eliminating those links altogether.

The following provides a first example of an algorithm for allocating bandwidth for ordinary network traffic based on the in-network compute resources allocated for an in-network compute task. AM 140 may obtain an in-network task, and may allocate in-network compute resources, a path including a set of links L that may be used for the in-network traffic, and the bandwidth B_l expressed as fraction of the link capacity) that is required for the in-network traffic. SM 150 may obtain the set of links L and the required traffic in each link l in the set of links L. SM 150 may set a static priority for the in-network traffic in each link l in L so that ordinary network traffic may only use up to MAXIMUM (0.10, 1.0-B_l) of the total capacity of the link l. In this example, there is some oversubscribing of link capacity, e.g., 110% of the total capacity of the link l are allocated to both the ordinary traffic and the in-network traffic. The in-network traffic may potentially receive 100% of the link capacity. In that situation, the ordinary traffic would receive 10% due to oversubscribing. This allocation would significantly decrease the likelihood of ordinary traffic interfering with the higher-priority in-network compute traffic, but without enforcing a strict isolation. In many scenarios, however, the in-network traffic is not expected to use the entire 100% of the link capacity at all times. In this case. the remaining bandwidth may be allocated for the ordinary network traffic.

The following provides a second example of an algorithm for allocating bandwidth for ordinary network traffic based on the in-network paths 142 and 144 and bandwidth allocated for an in-network compute traffic. The algorithm may receive as input the ports of the links 113, 115, 117, 119, 123 and 125 in paths 142 and 144 that are allocated for in-network traffic, and the estimated bandwidth per link, e.g., as percentage of the capacity of link 113, 115, 117, 119, 123 and 125. The total bandwidth requirement (% of link capacities) may be aggregated for each switch egress port (e.g., an output port of a switch that connects to a link) that a switch IB0 and IB1 may utilize to route packets of the in-network traffic towards the destination. A port bias may be calculated for each egress port by (other equations may be used):

$$\text{Port Bias} = (100\% - \text{Port } BW \text{ requirement}) / (\text{Number Of Ports} * 100\% - \text{Total } BW \text{ Requirement Aggregate})$$

For example, if a stream of in-network compute traffic has to cross two links, e.g., links 113 and 115 in order to reach its destination, e.g., switch 114 the bandwidth in the link having higher capacity may be limited to the capacity of the link with the lower capacity. For example, assuming that links 113 and 115 have the same capacity, if link 113 is allocated with 80% (or another proportion of) bandwidth for in-network compute traffic, and link 115 is allocated with 50% "(or another proportion of) bandwidth in-network compute traffic, then link 113 would constantly transmit in-network compute traffic at a rate that link 115 may not be to be able to accept. Thus, in some embodiments, it may be better to allocate only 50% (or another proportion of) bandwidth to in network traffic in link 113, and free the rest bandwidth for regular network traffic, since otherwise the extra 30% allocated to the in-network traffic may be wasted.

A switch IB0 and IB1 may prioritize per-packet port selection by a combination of local congestion information (e.g., queue lengths) and the calculated port bias. Congestion in a link may happen when many packets are being communicated on the link and because of this, the buffers of this link may be fuller compared with buffers of link that needs to transfer lass packets. As the buffers get fuller, packets may need to wait more before they can progress through the switch into the link. Absence of congestion may refer to a situation in which the switch sees a very short queue length (e.g., queue length that equals or is below a threshold) and presence of congestion may fere to a situation in which the queues are long (e.g., queue length above a threshold) or full. For example:

- In absence of congestion, an output port (e.g., an ingress port) for a packet of the ordinary network traffic may be selected from all possible output ports of a switch IB0 and IB1 in a weighted random fashion, where the weights are the port bias of the respective port. A weighted random selection may refer associating each output port with a weight, and selecting an output port where the chance of each output port to be selected equals the ratio of the weight of the output port divided by the sum of the weights of all the possible output ports.
- In presence of congestion, the weighted random selection may be performed with a weighted formula that factors in both port bias and present congestion information at each port. For example, the switch may examine the queue length for each relevant port, and temporarily increase the port bias towards ports with shorter queues in order to make it easier for the longer queues to start draining. If a particular port is a permissible selection and its queue lengths are very short while the other ports have very long queues, chance for selection of that port may be temporarily increased significantly even if the port bias is low. Other implementations are possible.

Figure 2:
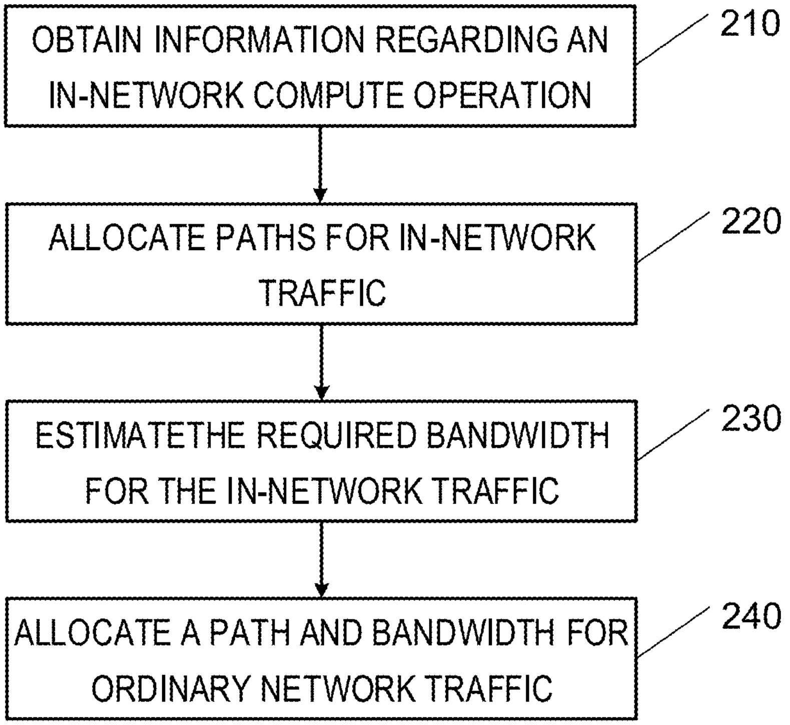
FIG. 2 is a flowchart of a method for performing routing in a computer network implementing in-network computing, according to embodiments of the present invention.

Reference is now made to FIG. 2, which is a flowchart of a method for performing routing in a computer network implementing in-network computing, according to embodiments of the invention. While in some embodiments the operations of FIG. 2 are carried out using systems as shown in FIGS. 1 and 3, in other embodiments other systems and equipment can be used.

In operation 210, a processor (e.g., processor 705 depicted in FIG. 3, and/or a processor implementing AM 140 and SM 150) may obtain information regarding an in-network compute operation. For example, the processor may obtain a request to perform an in-network compute operation and may allocate computing resources within components of the network (e.g., within switched IB0 and IB1 of network 100 depicted in FIG. 1). The processor may further obtain metadata related to the in-network compute operation as disclosed herein.

In operation 220, the processor may allocate paths for the in-network traffic of the in-network operation. For example, the processor may allocate static routes or paths in network 100 for the in-network traffic. In operation 230, the processor may estimate the required bandwidth for the in-network traffic, and the changes in the required bandwidth over time. For example, the processor may estimate the required bandwidth based on the amount of the resources required for the in-network compute operation, e.g., the bandwidth may increase as the amount of the required resources increases. The changes in the required bandwidth over time may be estimated, for example, based on metadata of the in-network traffic and/or in-network compute operation, as disclosed herein. The processor may further allocate the estimated bandwidth for the in-network traffic in the allocated paths, and notify the relevant switches (e.g., the switches that are part of the paths) of the bandwidth that is allocated for the in-network traffic. The estimates and allocations may change over time, and the processor may update the switched when such changes occur. In operation 240, the processor may allocate paths for the ordinary network traffic, based on the information regarding an in-network compute operation and/or based on the allocated compute resources. For example, the processor may allocate paths for the ordinary network traffic, based on the paths and bandwidth allocated for the network compute operation. Furthermore, the processor may reduce the ordinary network traffic in paths allocated for the in-network traffic. The processor may adjust the bandwidth allocated for ordinary network traffic in paths allocated for the in-network traffic based on the estimated bandwidth of the in-network traffic including estimated changes over time.

Figure 3:
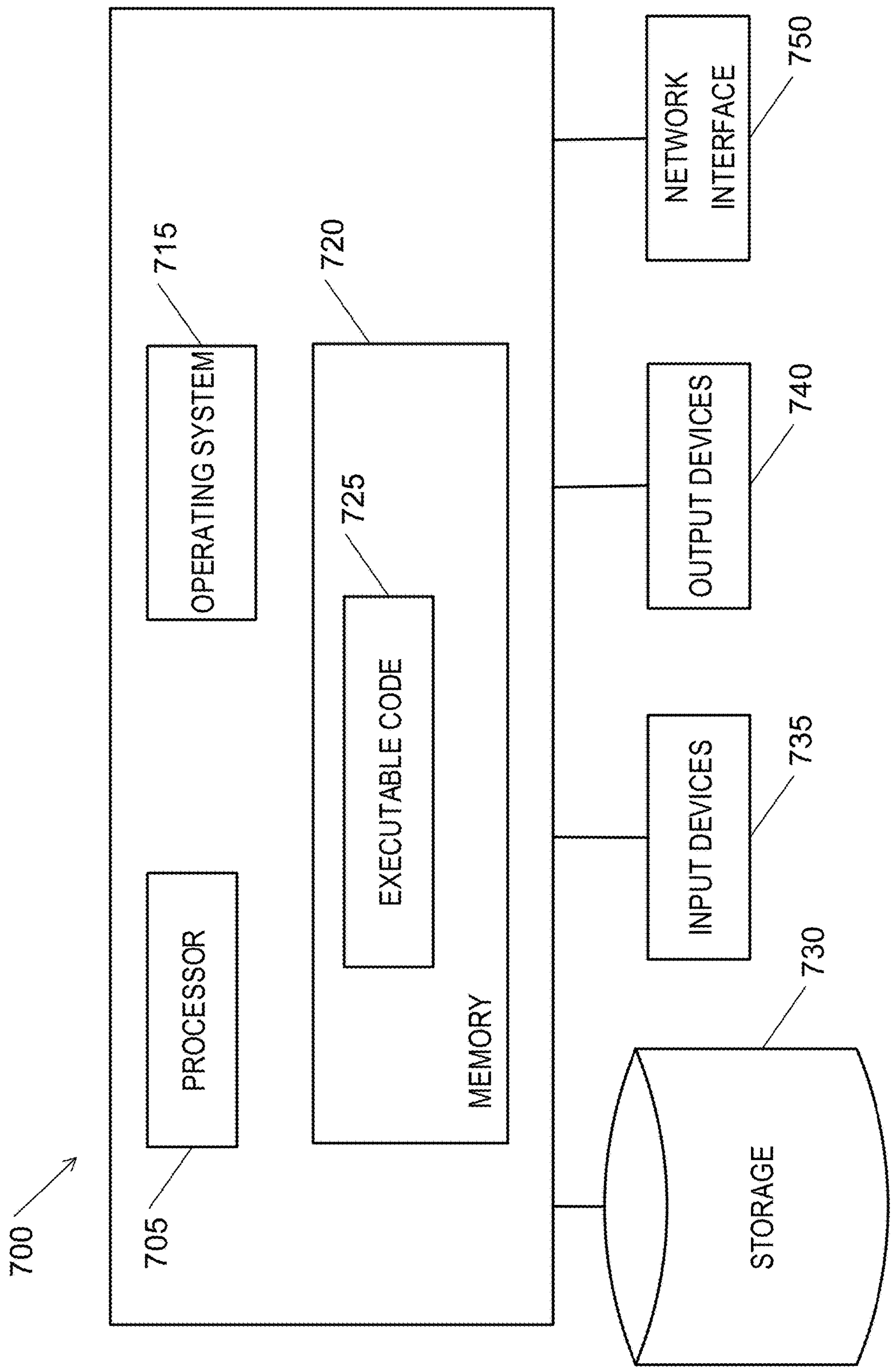
FIG. 3 shows a high-level block diagram of an exemplary computing device which may be used with embodiments of the present invention.

FIG. 3 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as client 120, host 130, NICs 122, 132 and switches IBO and IB1, as shown in FIG. 1 and other modules or equipment mentioned herein may be or include, or may be executed by, a computing device such as included in FIG. 3 or specific components of FIG. 3, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g. code 725), and/or data such as data related to in-network computing, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, telemetry data, etc. may be stored in a storage 730 and may be loaded from storage 730 into a memory 720 where it may be processed by processor 705. Some of the components shown in FIG. 3 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example,, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure embodiments of the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for performing routing in a computer network implementing in-network computing, the method comprising:

obtaining, at a network management application executed by a computer processor, information regarding processing power of at least one network switch in the computer network that is allocated to an in-network compute operation, wherein the in-network compute operation comprises a computational task required by a client and designated to be performed by the at least one network switch;

allocating, by the network management application, based on the allocated processing power of the at least one network switch, bandwidth required for in-network traffic associated with the in-network compute operation, wherein the in-network traffic is streamed to the at least one network switch and is terminated before getting to a host; and allocating, by the network management application, a path and bandwidth to which ordinary network traffic is directed, based on the allocated path and bandwidth for the in-network traffic.

2. The method of claim 1, further comprising:

allocating paths for in-network traffic associated with the in-network compute operation, wherein allocating the path and bandwidth for the ordinary network traffic is performed by reducing the priority of paths that are allocated for the in-network traffic.

3. The method of claim 2, further comprising:

estimating a required bandwidth for the in-network traffic in the paths allocated for the in-network traffic based on the required processing power, wherein allocating bandwidth for the ordinary network traffic in the paths allocated for the in-network traffic is performed based on the required bandwidth.

4. The method of claim 1, wherein the bandwidth for the ordinary network traffic is allocated so that the ordinary network traffic in a path serving the in-network traffic is inversely related to the required processing power.

5. The method of claim 1, wherein the path for the ordinary network traffic is allocated so that the ordinary network traffic in a path serving the in-network traffic is eliminated.

6. The method of claim 1, further comprising:

obtaining metadata of the in-network compute operation; and estimating a required bandwidth for in-network traffic based on the required processing power and the metadata, wherein allocating the path for the ordinary network traffic is performed based on the bandwidth required for the in-network traffic.

7. The method of claim 6, wherein the metadata comprises at least one element form the list consisting of: data type of the in-network compute operation, type and capacity of network components that form a path allocated for in-network traffic, what operation is performed by the in-network compute operation, quality of service (QoS) of the in-network compute operation and prioritization of the in-network compute operation.

8. The method of claim 1, further comprising:

allocating paths and bandwidth for the in-network traffic based on the required processing power.

9. The method of claim 8, wherein:

the path and bandwidth for the ordinary network traffic are allocated using flow adaptive routing, and wherein paths and bandwidth for in-network traffic are allocated statically.

10. The method of claim 1, wherein the computational task is related to machine learning, high performance computing (HPC), an in-network cache application or to consensus protocols.

11. A method for performing routing in a computer network, the method comprising:

obtaining, at a network management application executed by a computer processor, with relation to an at least one network switch used for switching operations and for in-network compute operations, required processing power that are associated with the in-network operations, wherein the in-network compute operations comprise computational tasks required by a client and designated to be performed by the at least one network switch, that would otherwise be executed by a host processor;

allocating, by the network management application, paths in the computer network for traffic that is related to the in-network compute operation according to the required processing power of the at least one network switch, wherein the path is terminated at the least one network switch and before getting to a host; and reducing, by the network management application, traffic that is not related to the in-network compute operation in the paths allocated to the traffic that is related to the in-network compute operation.

12. A system for performing routing in a computer network implementing in-network computing, the system comprising:

a memory; and at least one processor to:

obtain information regarding processing power of at least one network switch in the computer network that is allocated to an in-network compute operation, wherein the in-network compute operation comprises a computational task required by a client and designated to be performed by the at least one network switch;

allocate, based on the allocated processing power of the at least one network switch, bandwidth required for in-network traffic associated with the in-network compute operation, wherein the in-network traffic is streamed to the at least one network switch and is terminated before getting to a host; and allocate a path and bandwidth to which ordinary network traffic is directed, based on the allocated path and bandwidth for the in-network traffic.

13. The system of claim 12, wherein the at least one processor is further to:

allocate paths for in-network traffic associated with the in-network compute operation, wherein the at least one processor is to allocate the path and bandwidth for the ordinary network traffic by reducing the priority of paths that are allocated for the in-network traffic.

14. The system of claim 13, wherein the at least one processor is further to:

estimate a required bandwidth for the in-network traffic in the paths allocated for the in-network traffic based on the required processing power, wherein the at least one processor is to allocate bandwidth for the ordinary network traffic in the paths allocated for the in-network traffic based on the required bandwidth.

15. The system of claim 12, wherein the at least one processor is to allocate bandwidth for the ordinary network traffic so that the ordinary network traffic in a path serving the in-network traffic is inversely related to the required processing power.

16. The system of claim 12, wherein the at least one processor is to allocate the path for the ordinary network traffic so that the ordinary network traffic in a path serving the in-network traffic is eliminated.

17. The system of claim 12, wherein the at least one processor is further to:

obtain metadata of the in-network compute operation; and estimate a required bandwidth for in-network traffic based on the required processing power and the metadata, wherein the at least one processor is to allocate the path for the ordinary network traffic based on the bandwidth required for the in-network traffic.

18. The system of claim 17, wherein the metadata comprises at least one element form the list consisting of: data type of the in-network compute operation, type and capacity of network components that form a path allocated for in-network traffic, what operation is performed by the in-network compute operation, quality of service (QoS) of the in-network compute operation and prioritization of the in-network compute operation.

19. The system of claim 12, wherein the at least one processor is further to:

allocate paths and bandwidth for the in-network traffic based on the required processing power.

20. The system of claim 19, wherein the at least one processor is to:

allocate the path and bandwidth for the ordinary network traffic using flow adaptive routing, and allocate paths and bandwidth for in-network traffic statically.

* * * * *